United States Patent [19]
Dressler

[11] 3,754,124
[45] Aug. 21, 1973

[54] APPARATUS FOR POSITIONAL CONTROL
[75] Inventor: Robert L. Dressler, Birmingham, England
[73] Assignee: The Dunlop Company Limited, London, England
[22] Filed: Dec. 29, 1971
[21] Appl. No.: 213,754

Related U.S. Application Data
[63] Continuation of Ser. No. 804,821, March 6, 1969, abandoned.

[30] Foreign Application Priority Data
Mar. 9, 1968 Great Britain.................. 11,607/68

[52] U.S. Cl............ 235/151.11, 156/402, 318/567, 318/604
[51] Int. Cl. ...................... G05b 19/34, B29h 17/18
[58] Field of Search................ 235/151.11; 318/567, 318/568, 604; 156/132, 135, 350, 358, 367, 368, 397, 398, 400, 402, 408, 409, 410

[56] References Cited
UNITED STATES PATENTS
3,465,217 9/1969 Kress.................................. 318/601
2,898,483 8/1959 Muller........................... 235/151.11
2,853,664 9/1958 Towns et al. .................. 235/151.11
3,064,169 11/1962 Mynall............................ 318/604
3,239,735 3/1966 Raider et al. ...................... 318/601
3,333,089 7/1967 Saylor et al..................... 235/151.11
3,524,784 8/1970 Isaksson et al...................... 156/367
2,555,343 6/1951 Jones.................................. 156/402

Primary Examiner—Felix D. Gruber
Attorney—Carroll G. Harper

[57] ABSTRACT

Positional control apparatus for controlling a tool, especially a spinning tool for consolidating tyre building components on a drum, comprising a multichannel digitizer for indicating tool position, a multichannel device adapted to be preset to provide a signal on any one of its output channels, the number of channels of the digitizer equally the number of channels of the device, and a comparator device for comparing the signals from the digitizer and multichannel device to control the tool appropriately, of which the following is a specification.

11 Claims, 3 Drawing Figures

APPARATUS FOR POSITIONAL CONTROL

This is a Continuation, of application Ser. No. 804,821 filed Mar. 6, 1969, and now abandoned.

This invention relates to apparatus for positional control, for example of rollers used in consolidating rubber components in the manufacture of tires. In the case of small tires, rollers are manually applied, but for large tires mechanical application is utilised, for example using a combination of pneumatic cylinders to set to roller attitude and application pressure, and a motor-driven lead screw to traverse the rollers across the component. The pneumatic cylinders and motor may all be controlled from a set of push buttons, but when each of a series of components requires different attitude and pressure settings and different traverse distances, the push button system is laborious. The object of the present invention is to provide improved apparatus particularly (but not exclusively) for this purpose.

BRIEF SUMMARY OF THE INVENTION

In accordance with the invention, positional control apparatus for controlling a tool comprises means for moving the tool, a first multi-channel output signalling means coupled to the tool for producing a signal on any of its output channels representing tool position, a second multi-channel output signalling means which is adapted to be preset to provide an output on any of its output channels, the number of output channels of the first signalling means equalling the number of output channels of the second signalling means, and a comparator device for receiving the signals of both signalling means and controlling said tool moving means according to the received signals.

The first multi-channel output means may be a digitizer coupled to the means for moving the tool e.g., a motor-driven lead screw for traversing the tool, or coupled to the tool itself so that the digitizer output signal denotes tool position. For example the digitizer may have up to ten output channels and as the tool passes along the lead screw between limit positions each output channel in turn is energised and then de-energised as the tool moves.

The second signalling means may comprise any electrical device capable of giving a steady output signal on one or other of its output channels e.g., a programme board having at least one row of sockets equal in number to the channels, e.g., 10, and by inserting a pin, which is engageable with any one of the sockets, in the appropriate socket, the output signal is obtained on the appropriate channel. Hence if the tool is to traverse to a position analogous to a signal output on the third channel of the digitizer the pin is inserted in the third socket, so that the comparator receives a steady signal from the board, and when "like" signals are received from both the programme board and the digitizer i.e., matching is achieved, the comparator operates to stop the motor.

Moreover, the comparator may also control motor direction, so that if the digitizer signal is "higher" than the board signal, the motor is controlled to rotate the lead screw in one direction which causes the digitizer to produce lower signals until matching is achieved, but if "lower" it may cause the motor to rotate the lead screw in the opposite direction.

The programme board may have a plurality of rows of sockets and the comparator may actuate a ring counter, or shift register, which automatically energises a successive row of the board when like signals are received i.e., at matching preferably also the ring counter simultaneously energises successive combinations of electro-pneumatic valves which control the tool or tools.

The invention will now be described with respect to apparatus for the control of tools used for consolidating tire building components i.e., plies, chafer strips, filler strips and the like, applied to a substantially cylindrical tire building drum. This consolidating process is also known in the art as spinning. Reference will be made to the accompanying drawings of which:

FIG. 1 shows in diagrammatic form the control apparatus for tire component spinning tools, FIG. 2 shows diagrammatically a first modification of the embodiment shown in FIG. 1, FIG. 3 shows diagrammatically a second modification of the embodiment and modification shown in FIGS. 1 and 2 respectively.

Throughout the figures, like reference numerals refer to like integers.

DETAILED DESCRIPTION

Two particular forms of tire building apparatus to which the embodiments of the present invention are applicable comprise the apparatus disclosed in copending and commonly assigned patent application Ser. Nos. 778,943, filed Nov. 26, 1968, now U.S. Pat. No. 3,616,060 and 711,727, filed Mar. 8, 1968, now abandoned. Each application discloses apparatus comprising at least one pair of spinning tools which are mounted on a lead screw having right and left hand thread portions so that by rotation of the screw the tools may be moved simultaneously in opposite directions equal distances with respect to the mid-circumferential plane of a tire building drum to consolidate one or more tire building components applied thereto. The attitude of the tools with respect to the drum and the pressure applied to the or each component by the tools may be set by energizing combinations of electro-pneumatic valves.

Figure 1:
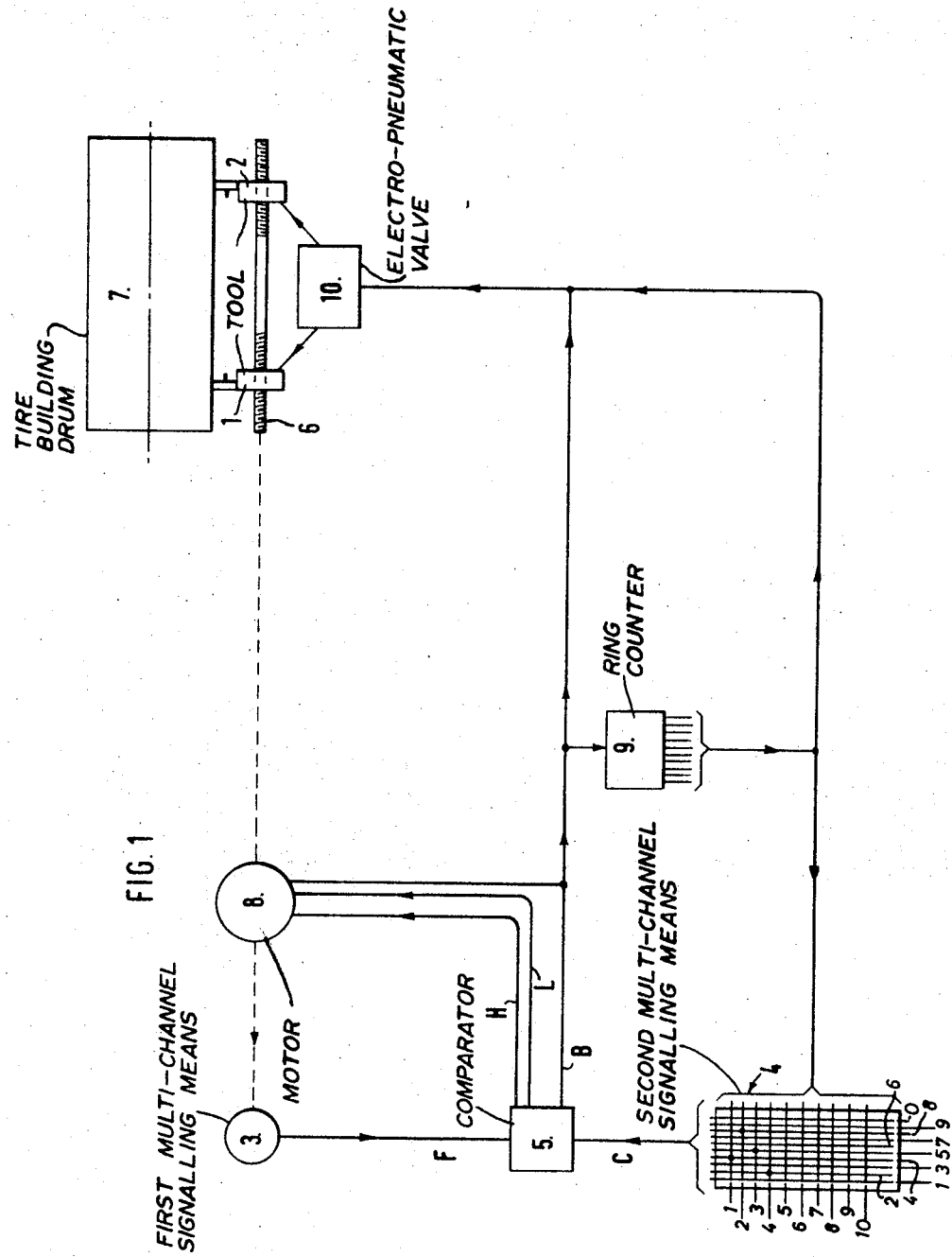

As shown in FIG. 1 positional control apparatus for controlling the position and attitude of two spinning tools 1 and 2 at various steps of a spinning programme comprises a first multi-channel output signalling means 3, a second multi-channel signalling means 4, and a comparator device 5 of well-known form all electrically connected together as shown diagrammatically in FIG. 1.

The spinning tools 1 and 2 are mounted on a lead screw 6 disposed with its axis spaced apart from but parallel to the axis of a tire building drum 7 to which tire building components are applied, and for example, for every pair of components (one associated with each bead region of the tire being built on the drum) the tools may be caused by the apparatus to go through a programme of up to ten steps.

The first multi-channel output signalling means 3 comprises a digitizer of well-known form to those versed in the art driven directly from the motor 8 which rotates the lead screw 6 and gives a "follow" signal from one out of ten output channels in turn, thus representing the actual position of the tools on the lead screw. For example each channel may indicate 1 inch of movement of each of the tools on the lead screw. This "follow" signal is compared with a "command" signal received from the second signalling means 4.

This comprises a programme board having 10 columns of 10 rows of sockets from which board by inserting pins in appropriate positions, the "command" signal may be preset. The rows of the board represent the steps of the programme whilst the columns represent the positions of the tools. As shown in FIG. 1 the tools move to position 4 on step 1, position 8 on step 2, position 5 on step 3 and position 2 on step 4.

In use, if the "follow" signal is less than the "command" signal, the comparator gives a "low" output signal which switches the motor 8 to drive the tools apart, thus increasing the "follow" signal. Similarly a "high" output switches the motor to drive the tools together, thus decreasing the follow signal. When the "follow" and "command" signals match a "balance" output appears which stops the motor and initiates a ring counter 9 or a shift register of well-known form to advance to programme to step 2. This is effected by the counter de-energizing row 1 of the programme board and energizing row 2, thus putting a new "command" signal into the comparator.

Thus, as shown in FIG. 1, which depicts an embodiment of the invention in a combined schematic and flow-diagram configuration, it is to be understood that the motor 8 may comprise any one of many well-known bidirectional motors, and may include a simple relay control circuit responsive to the H, L, and B signals to cause operation of the motor as described above. For example, the motor 8 can include a three-phase motor wherein its rotational direction may be controlled by relays responsive to the H, L, and B signals to alter the phase relations of the AC drive voltages applied to the motor windings.

The counter, at the same time as advancing the programme to the next step sends a pulse signal in combination with the "balance" signal from the comparator to the electro-pneumatic valves (represented simply by a block 10 in FIG. 1) connected to the spinning tools to set the attitude or pressure of the tools to that required throughout step 2. The sequence of operations thus continues throughout the programme of ten steps. (N.B. In the Figures the leads carrying the "high," "low," "balance," "follow" and "command" signals are referred to by H, L, B, F and C respectively).

In the building of a complete tire several programmes are necessary, each corresponding to the consolidation of one or two components on the drum. Thus, each time a fresh component or pair of components is applied, the operator has to re-set the programme by re-positioning the pins in the programme board. However by means of the first modification about to be described, this disadvantage may be overcome and the tools controlled to carry out say eight programmes with a total of say sixty steps.

Figure 2:
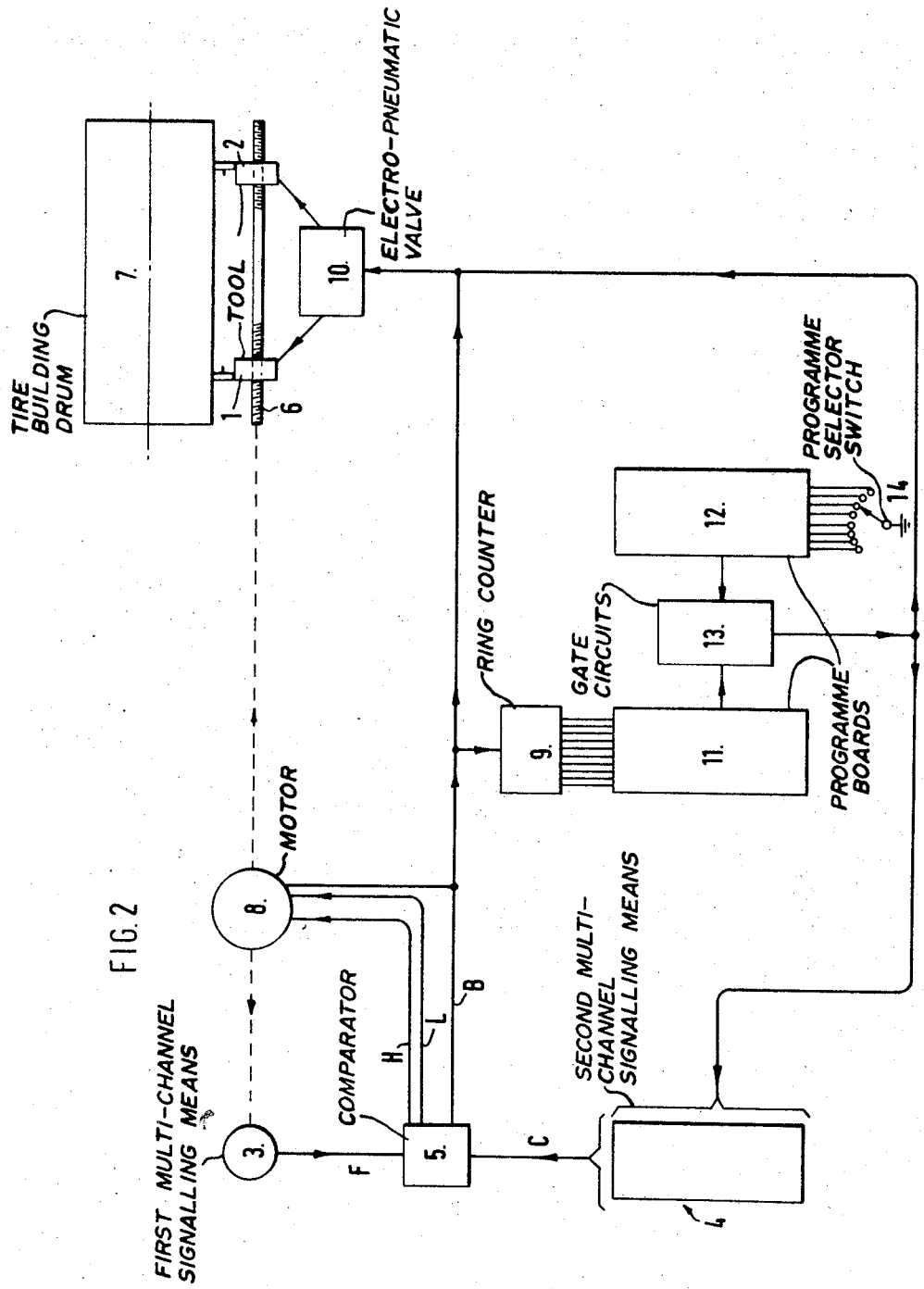

As shown in FIG. 2 this first modification comprises extending the programme board four to 60 rows each of ten columns and adding two further programme boards 11 and 12, 60 gate circuits 13 and a programme selector switch 14.

By inserting pins in appropriate positions on the boards 11 and 12 specific gate circuits are opened so that with the programme switch set at the desired programme a signal derived from the counter 9 energizes a particular row on the programme board 4 thus causing the tools to go through the corresponding programme step, and at the same time this signal after passing through the gate circuits causes the attitude and/or pressure of the tools to be re-set by appropriately energizing or de-energizing the electro-pneumatic valves 10. Thus to change the programme in this modification the operator merely has to select the appropriate programme number on the manual programme switch.

By these means, the operation may remain automatic up to each point when the counter completes a cycle, corresponding for example to say, the first ten rows of the board, and then manual switching may enable say, the next six rows to be effective one after the other and so on, the number of rows energized by each position of the switch corresponding to the number of steps in the programme selected.

Figure 3:
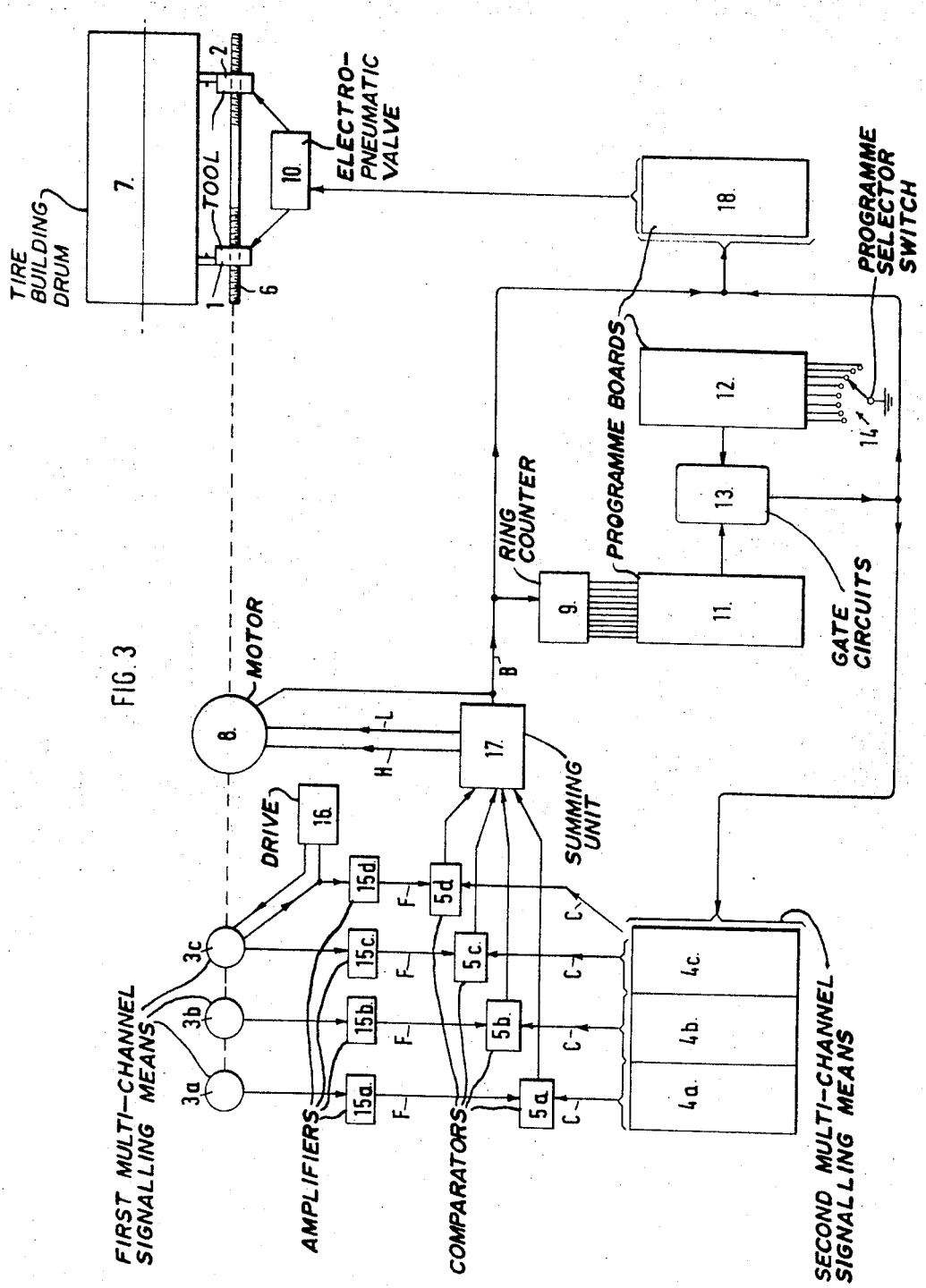

The second modification which is illustrated in FIG. 3 provides far more accurate control over tool position than that provided in the embodiment and the first modification thereof illustrated respectively in FIGS. 1 and 2. To this end a number, in this instance three, of multi-channel output means 3a, 3b and 3c are provided to give "follow" signals which represent tool position, each means providing a more accurate representation of tool position. In this instance three digitizers are each geared in the ratio 10:1 to the next and connected to the motor 8 driving the lead screw 6. The first digitizer 3a represents ten tool positions and each will correspond to an actual tool position between two points which are a distance apart equal to a tenth of the total tool travel. Thus if the tools can each travel say 100 inches, each signal (received from one of 10 channels) indicates tool position within a 10 inch span. The second digitizer 3b is geared at 10:1 to the first digitizer 3a and the output from one of its 10 channels represents tool position to within 1 inch. In a like manner the third digitizer gives tool position to within 0.1 inch. The "follow" signals from each of the digitizers are amplified in 10-channel amplifiers 15a, 15b and 15c before being compared in three comparators 5a, 5b and 5c with "command" signals from one of three programme boards 4a, 4b and 4c.

The third digitizer also has a refinement wherein tool position to within one half-digit may be represented. To this end a drive unit 16 of known form geared to the third digitizer 3c is provided, which gives an output signal which is amplified by an amplifier 15d and compared with a command signal from programme board 4c in a fourth comparator 5d. It is to be understood, of course, that while the comparators 5a–5d are illustrated in flow-diagram form as having only one output each, those circuits are similar to the comparator 5 in FIG. 1, thus having H, L and B outputs;

The comparison result from each of the comparators 5a, 5b, 5c and 5d are applied to a summing unit 17 which provides, as appropriate, the "high" and "low" signals to operate the motor 8, and the "balance" signal to operate the ring counter 9.

This second modification includes as a further feature a programme board 18 or like means connected to the electro-pneumatic valves 10. This is used particularly when a different size of tire is to be built on the drum 7 and rapid changes of programme in terms of tool attitude and consolidating pressure are facilitated.

Whilst in the second modification the use of decimal digitizers has been described, digitizers utilising a binary code could replace these.

The tool positions in embodiment and modifications just described are measured by digitizers rather than by using a transducing means giving a "follow" signal directly proportional to tool position. The reason for this is that the accuracy of the digital system remains substantially constant, and the signals are unaffected by such parameters as voltage variations, ageing, wear, electrical interference, and ambient temperature changes.

I claim:

1. A control apparatus for controlling the position of a tool comprising positioning means for moving the tool, a first multi-channel output signalling means responsive to the movement of the tool for producing a signal on its output channels representing tool position, wherein the presence of said signal on different individual ones of said output channels corresponds respectively to different tool positions, a second multi-channel output signalling means for providing a signal on its output channels representing a pre-set tool position, the number of output channels of said first signalling means equalling the number of output channels of the second signalling means, and a comparator device associated with said first and second multi-channel output signalling means for comparing the output signals of both signalling means and controlling said positioning means according to the compared output signals.

2. A control apparatus according to claim 1 wherein the first multi-channel output signalling means comprises at least one multi-channel digitizer responsive to the movement of the tool and coupled to the positioning means for moving the tool.

3. A control apparatus according to claim 2 wherein the multi-channel digitizer has up to 10 output channels and includes means for energizing and de-energizing each of said output channels in turn as the tool is moved.

4. A control apparatus according to claim 1 wherein said comparator device includes means for controlling the positioning means until like signals are provided from both the first and second signalling means and when said like signals are provided for stopping the tool movement.

5. A control apparatus according to claim 1 wherein the second multi-channel output signalling means comprises a programme board having at least one row of sockets equal in number to the output channels, said sockets corresponding respectively to said channels, said control apparatus further comprising a pin engageable with any of the sockets and means responsive to insertion of said pin in any one said socket for causing an output signal representing a pre-set tool position to be provided on the corresponding one of said channels.

6. A control apparatus according to claim 1 wherein the second multi-channel output signalling means comprises a programme board having at least two rows of sockets, the number of sockets in each row being equal to the number of output channels, said apparatus further comprising pins engageable with one socket in each row, means responsive to insertion of said pins for causing an output signal representing a pre-set tool position to be provided on one of said channels, and a ring counter responsive to the comparator device to energize a successive row of sockets of the board and provide its output signal representing a pre-set tool position.

7. A control apparatus according to claim 6 comprising a plurality of electro-pneumatic valves for controlling the attitude of the tool, and means coupling said valves for operation by said ring counter wherein said valves are energizable by the ring counter simultaneously with the energizing of a successive row of sockets of the board.

8. A control apparatus according to claim 7 comprising a further multi-channel signalling means for further controlling the electro-pneumatic valves which control the attitude of tool, said further signalling means being coupled for actuation by the ring counter.

9. A control apparatus according to claim 6 comprising at least two additional programme boards and a plurality of gate circuits equal in number and coupled respectively to the rows of sockets of the aforesaid second signalling means programme board, said additional programme board including means adapted to be pre-set for opening a selected number of the gate circuits and means for operating the ring counter to energize successive rows of sockets corresponding to the selected number of opened gate circuits.

10. A control apparatus according to claim 1 wherein the first multi-channel output signalling means comprises a plurality of successive digitizers coupled to the positioning means, each digitizer being geared to the next in a fixed ratio so that the output signal of one digitizer represents a fixed proportion of tool movement represented by the output signal of the next digitizer.

11. A control apparatus according to claim 10 comprising a plurality of successive comparators equal in number to the successive digitizers, said comparators corresponding respectively to said digitizers, said second multi-channel signalling means comprising a plurality of second digitizers equal in number to the comparators, and a summing means associated with said plurality of comparators for summing the output of each comparator and controlling said positioning means.

* * * * *